Oct. 16, 1934.  L. V. BLACK  1,976,915
SAFETY GLASS
Filed April 1, 1933
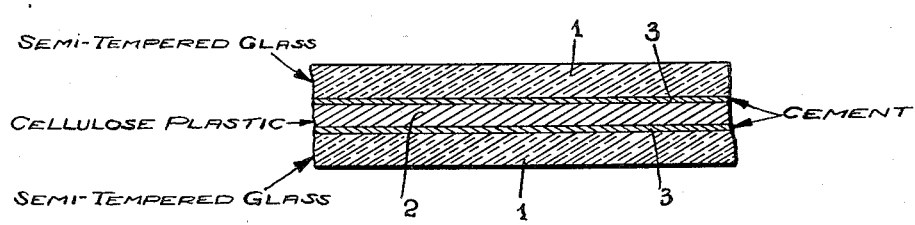
INVENTOR
Lloyd V. Black.
BY Bradley & Bee
ATTORNEYS Patented Oct. 16, 1934

1,976,915

UNITED STATES PATENT OFFICE 1,976,915

SAFETY GLASS

Lloyd V. Black, Tarentum, Pa., assignor to Pittsburgh Plate Glass Company, a corporation of Pennsylvania Application April 1, 1933, Serial No. 663,885

2 Claims. (Cl. 49—92)

The invention relates to safety or laminated glass which ordinarily consists of two sheets of plate or window glass about ⅛ inch in thickness cemented to the opposite sides of a sheet of reinforcing, such as cellulose nitrate, or cellulose acetate. Glass of this type is much more resistant to fracture than ordinary plate glass ¼ inch in thickness, and gives a large factor of safety as used for automobile windshields and the like, since the reinforcing holds the glass in place even after it is fractured by a heavy blow. It is, however, often fractured in service and under extreme conditions, even the reinforcing is severed and the plate is broken into separated sections, so that it will inflict injuries to the same extent as ordinary plate or window glass. I have found that the resistance of the plate to breakage may be greatly increased by substituting for the ordinary plate and window glass used in this product, a tempered or case-hardened glass, such as that described in the patent to G. D. Despret No. 1,820,601; but this substitution has an objection which renders the product unsuitable for use in many cases, namely that when the glass is fractured in an accident, it is rendered practically non-transparent due to the fact that the fractured sheets are brought to a granular condition throughout. In the case of a windshield, the operator of the machine is thus deprived of all view of the road, and a serious accident is liable to result, due to the operator's lack of vision through the shield while bringing the machine to a stop. The object of the present invention is to provide a laminated glass which has the advantage incident to the use of case-hardened sheets, but which avoids the objection incident to the glass shattering to granular form in case of an accident. I have found that this result can be achieved by giving the glass sheets employed what may be termed a semi-temper. That is, they are tempered or case-hardened so that their strength is greatly increased, as compared with ordinary plate or window glass, but at the same time the glass, in shattering, is reduced not to granular form but to pieces of such size that they do not interfere materially with the vision of an operator, the fracture of the glass being comparable in character to that which occurs when a standard piece of laminated glass is shattered. A plate of laminated glass made in accordance with the invention is illustrated in the accompanying drawing, wherein:

The figure is a sectional view through the plate, the thickness of the sheets employed being exaggerated for the sake of clearness in illustration.

Referring to the drawing, 1, 1 are sheets of semi-tempered glass produced as later described, 2 is an interlayer of tough reinforcing material, such as one of the cellulose plastics, and 3, 3 are layers of cement such as gelatin, resin or the like depending on the character of the interlayer.

In tempering the glass, it is heated to a point approximating softness, and is then exposed to air blasts applied uniformly to the sheet while it is held in vertical position, the air pressure applied being such as will give just the right degree of temper. If the glass is cooled too rapidly, it becomes completely tempered, and when fractured at any point, the entire sheet becomes granular and vision therethrough is substanially cut off. On the other hand, the cooling must be sufficiently rapid to multiply the resistance to fracture several times over.

The apparatus preferably employed is of the character shown in my pending application, Serial No. 389,354, filed January 28, 1932, the air being applied by spaced nozzles distributed over the area of the sheet on opposite sides thereof. One arrangement giving the desired result involves the use of nozzles about five inches long spaced two inches from center to center with their ends about 1½ inches from the glass sheet. This arrangement gives the desired semi-temper to glass sheets ⅛ inch in thickness if an air pressure of six ounces is employed. If these sheets were to be completely tempered, the air pressure employed would be about forty-eight ounces. The air is preferably applied for forty seconds, but may be applied longer without affecting the temper.

Glass sheets hardened by this method have much greater flexibility than sheets which are not hardened, and will sustain a uniformly distributed load which is approximately three times the load sustained by sheets of the same dimensions which are not case-hardened. The tensile strength of this glass is approximately from 3 to 4 times that of untempered glass and its modulus of rupture three times as great. The ratio of the modulus of rupture of the glass as compared with completely tempered or case-hardened glass is approximately three to five.

When composited in the usual way to form laminated glass, the plates under break tests exhibit very marked superiority over laminated glass employing ordinary plate or window glass. As illustrative of this, a two pound ball dropped eighteen inches upon ordinary laminated glass cracks both the upper and lower sheets, while the same test applied to a plate using the improved glass cracks only the upper sheet. A two pound ball dropped four feet upon ordinary laminated glass produces what is known as a "four piece break", which means that the plate is broken into four separate pieces, the reinforcing sheet being severed into four pieces as well as the glass. The same test applied to the improved plate fractures the glass, but does not break or sever the reinforcing sheet. Even when the ball is dropped eight feet onto the improved plate, the reinforcing sheet still remains intact. In all of these tests with the improved plate in which fracture of the glass occurs, vision therethrough is not impaired sufficiently to prevent the operator of a machine in which the glass is used as a windshield from safely directing the machine until the glass can be replaced. The improved glass is, therefore, much safer for windshield constructions than ordinary laminated glass or laminated glass employing completely tempered or case-hardened glass, the latter type being impractical for windshields as heretofore pointed out because of the complete obstruction to vision which occurs when any fracture of the glass occurs.

What I claim is:

1. A laminated plate comprising two glass sheets cemented to the opposite sides of a sheet of reinforcing material, said glass sheets being case hardened to an extent sufficient to at least double their tensile strength, but short of the point at which the glass assumes granular form and obscures vision therethrough when fractured.

2. A laminated plate comprising two glass sheets cemented to the opposite sides of a sheet of reinforcing material, said glass sheets being semi-case-hardened so that the modulus of rupture of the glass is approximately three-fifths that of completely case-hardened glass.

LLOYD V. BLACK.